United States Patent [19]

Mukouzaka

[11] Patent Number: 4,830,472
[45] Date of Patent: May 16, 1989

[54] PROCESSING UNIT TO PERFORM OPERATION OF IMAGES

[75] Inventor: Naohisa Mukouzaka, Hamamatsu, Japan

[73] Assignee: Hamamatsu Photonics Kabushiki Kaisha, Hamamatsu, Japan

[21] Appl. No.: 911,409

[22] Filed: Sep. 25, 1986

[30] Foreign Application Priority Data

Sep. 27, 1985 [JP] Japan ................................ 60-213848

[51] Int. Cl.$^4$ ........................... G06F 7/56; G02F 1/03
[52] U.S. Cl. .................................. 350/374; 350/400; 350/356; 364/713
[58] Field of Search ............... 350/370, 374, 388, 356, 350/400; 250/213 R; 364/713

[56] References Cited

U.S. PATENT DOCUMENTS 3,566,130  2/1971  Aldrich ................................. 250/213
4,124,278  11/1978  Grinberg et al. .................... 350/388

OTHER PUBLICATIONS

Takumi Minemoto et al., "Optical Parallel Logic Gate Using Spatial Light Modulators with the Pockels Effect: Implementation Using Trace PROM Devices", Applied Optics, vol. 25, No. 6, 15 Mar., 1986, pp. 948–955.
Takumi Minemoto et al., "Optical Parallel Logic Gate Using Spatial Light Modulators with the Pockels Effect", Applied Optics, vol. 24, No. 14, 15 Jul., 1985, pp. 2055–2062.
Walde et al., "Operating Modes of the Microchannel Spatial Light Modulator", Opt. Eng., Nov./Dec. 1983, vol. 22, No. 6. pp. 695–703.

Primary Examiner—Bruce Y. Arnold
Attorney, Agent, or Firm—Spencer & Frank

[57] ABSTRACT

A processing unit performs an OR, NOR, NAND, AND, XOR, $\overline{XOR}$, $\overline{A}+B$, $A\cdot\overline{B}$, $A+\overline{B}$, $\overline{A}\cdot B$, $A$, $\overline{A}$, $B$, $\overline{B}$, T or F operation using three spatial light modulators and selection means.

3 Claims, 4 Drawing Sheets

FIG. 3(iii)
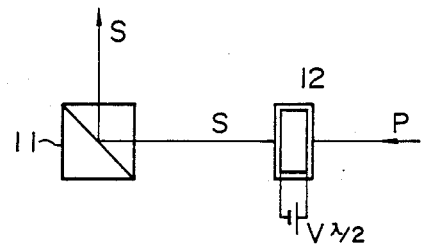

PROCESSING UNIT TO PERFORM OPERATION OF IMAGES

BACKGROUND OF THE INVENTION

The present invention relates to a processing unit to perform a logic operation of images.

Logic operations of images can be performed by an image processing technique realized by a computer. The operations require a television image pickup device, a first frame memory to store image information in picture element cell units, a second frame memory to store the result of operations and an operation circuit to perform the logic operations.

The process of logic operations consists of a plurality of series operations and thus it requires a larger processing unit as the number of picture element cells is increased.

The objective of the present invention is to present a processing unit to perform a logic operation of images, wherein such imaging devices as spatial light modulators are used to perform up to 16 types of logic operations.

SUMMARY OF THE INVENTION

The processing unit to perform a logic operation of images, which is built in accordance with the present invention, consists of a first imaging device which can store a first image and which can output the first image or its inverted image in the form of an optical signal; a second imaging device which can store a second image and which can output the second image or its inverted image in the form of an optical signal; selection means which can select either the first or second image and a third imaging device whereto an output of the selection means is fed and written there to perform an OR operation of the first and second images, or whereto an output of the selection means is fed from the first or second imaging device, the output being read out by the output fed respectively from the second or first imaging device.

DESCRIPTION OF THE PREFERRED EMBODIMENTS

Figure 1:
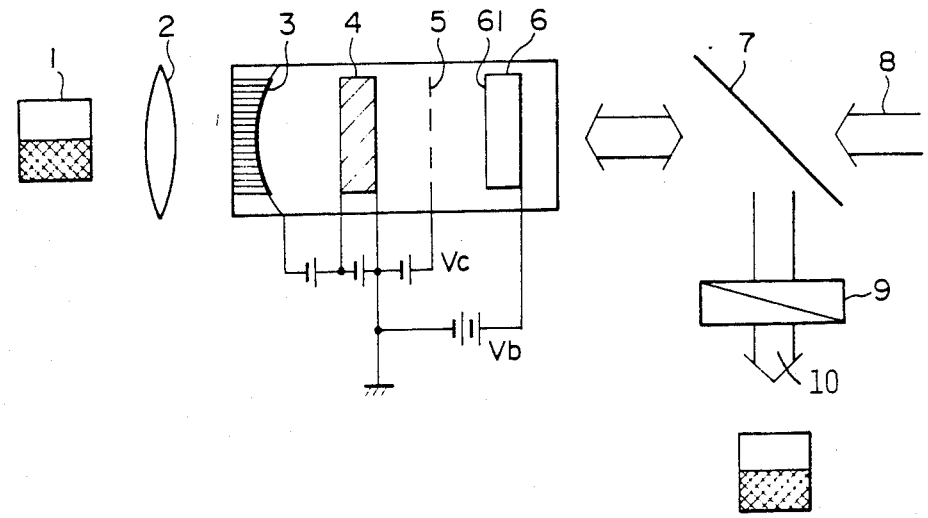
FIG. 1 is a block diagram of a spatial light modulator used as a basic element of the processing unit to perform an operation of images in accordance with the present invention.

The present invention will be described hereinafter referring to the drawings.

FIG. 1 is a block diagram of a spatial light modulator which is used as a basic element of the processing unit to perform an operation of images.

An incoherent image 1 incident on photocathode 3 of the spatial light modulator passing through a lens 2 is converted into a photoelectron image. p The photoelectron image is multiplied by using a microchannel plate 4 and then a charge pattern is formed on a surface 61 of a crystal 6. A grid 5 is interposed between the microchannel plate 4 and crystal 6, the electric field across the crystal 6 being changed corresponding to the charge pattern. The refractive index of the crystal 6 changes in accordance with the Pockels effect.

When linearly polarized laser beam 8 is incident on the crystal 6, coherent light containing information of the incoherent light being input can be output from a polarizer 9 because the light beam reflected from the surface 61 to store electron charges has a polarization angle which differs from the incident laser light.

The main capabilities of the spatial light modulator used in the present invention will be described hereinafter.

I. Charge storage capability

The spatial light modulator provides the capability to store a charge distribution on the surface of an electrooptic crystal for a long period of time.

The crystal 6 provides an extremely high resistance value and a charge distribution over the crystal surface 61 can be stored for 5-6 days or more.

II. Inverted image forming capability

Figure 2:
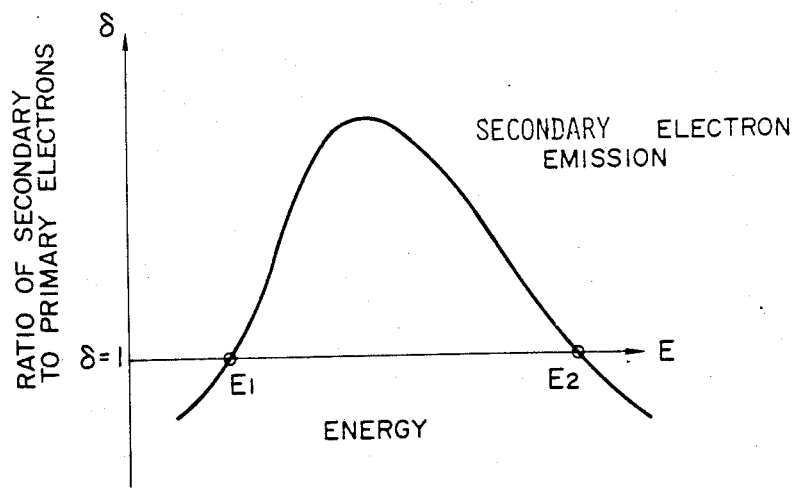
FIG. 2 is a graph of the secondary electron emission at the surface of 2 crystal in a spatial light modulator.

FIG. 2 is a graph showing the secondary electron emission on the surface of the electrooptic crystal.

When energy E of the primary electrons incident on the crystal surface 61 is less than a first threshold E1 at the first crossover point or greater than a second threshold E2 at the second crossover point, the primary electrons are greater than the secondary electrons in number ($\delta < 1$) and the crystal surface is negatively charged.

When energy E of the primary electrons is greater than the first threshold E1 and less than the second threshold E2, the secondary electrons are greater than the primary electrons in number ($\delta > 1$) and the crystal surface is positively charged.

Positive or negative charges are written into the crystal surface by controlling Vb and Vc (shown in FIG. 1).

III. Logical OR operation capability

Assume that a first image is written into the spatial light modulator. A previously-written image is erased by a uniform light beam when the mesh voltage Vc is set at 2.0 kV. Thereafter the first image is written into the spatial light modulator with Vc=2.0 kV and Vb=0.8 kV. Then, a voltage difference Vc−Vb of 1.2 kV appears across the crystal 6 to provide a halfwave voltage; that is, a voltage across crystal 6 which has a magnitude required to change the output intensity from minimum to maximum. A second image is successively written into the spatial light modulator where the first image was written. An overlap portion is generated by the first, but because the potential of the crystal surface 61 is limited to Vc=2.0 kV and therefore the voltage at the overlap portion remains 2.0 kV, the same potential is kept at that portion where the first and second images are not duplicated. This implies that an OR operation of images is being performed.

Selection means outside the spatial light modulator will be described because of its importance.

Figure 3I:
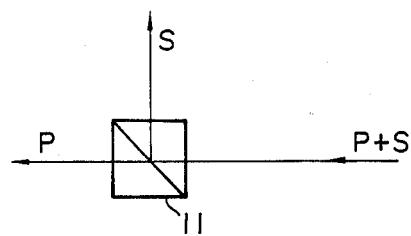
FIGS. 3(i) through 3(v) are block diagrams of the selection means of the invention.
Figure 3:
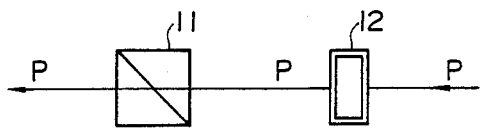
Figure 3:
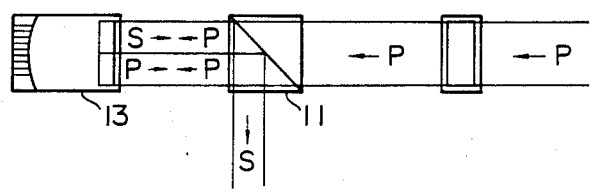
Figure 3V:
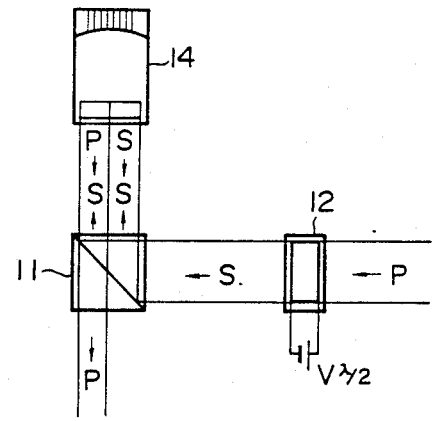

FIGS. 3(i) through 3(v) show the selection means in operation.

Selection means consists of a polarized light beam splitter 11 and a crystal 12 which is operated as a halfwave plate.

In FIG. 3(i), P- and S-polarized light beams, shown from the right, are incident on the polarized beam splitter 11.

Only the P-polarized beam can pass through the beam splitter 11 and only the S-polarized beam can reflect from the beam splitter 11.

When a P-polarized beam is incident on the selection means as shown in FIG. 3(ii), it can pass through the selection means. When the P-polarized light beam converted into the S-polarized light beam by applying a voltage to the crystal 12, as shown in FIG. 3(iii), is incident on the selecting means, it can reflect from the selection means.

A crystal plate to which a variable voltage is applied can be used as the selection means.

FIGS. 3(iv) and 3(v) show an embodiment of the crystal plate used as the selection means.

When a P-polarized light beam is incident on the crystal as shown in FIG. 3(iv), it can be led to spatial light modulator 13 passing through the crystal.

If the P-polarized light beam is partly converted into the S-polarized light beam by modulating the former with a spatial light modulator 13, as shown in FIG. 3(iv), only the converted part can be reflected from the polarizing light beamsplitter 11.

when a voltage is applied to crystal 12, the incident light beam reflects and then it is incident on another spatial light modulator 14. Only the modulated portion or that which is converted from the S-polarized light beam into the P-polarized light beam can pass through the polarizing light beamsplitter 11.

The preferred embodiment described hereinafter is constructed based on the functions and principles which are described heretofore.

Figure 4:
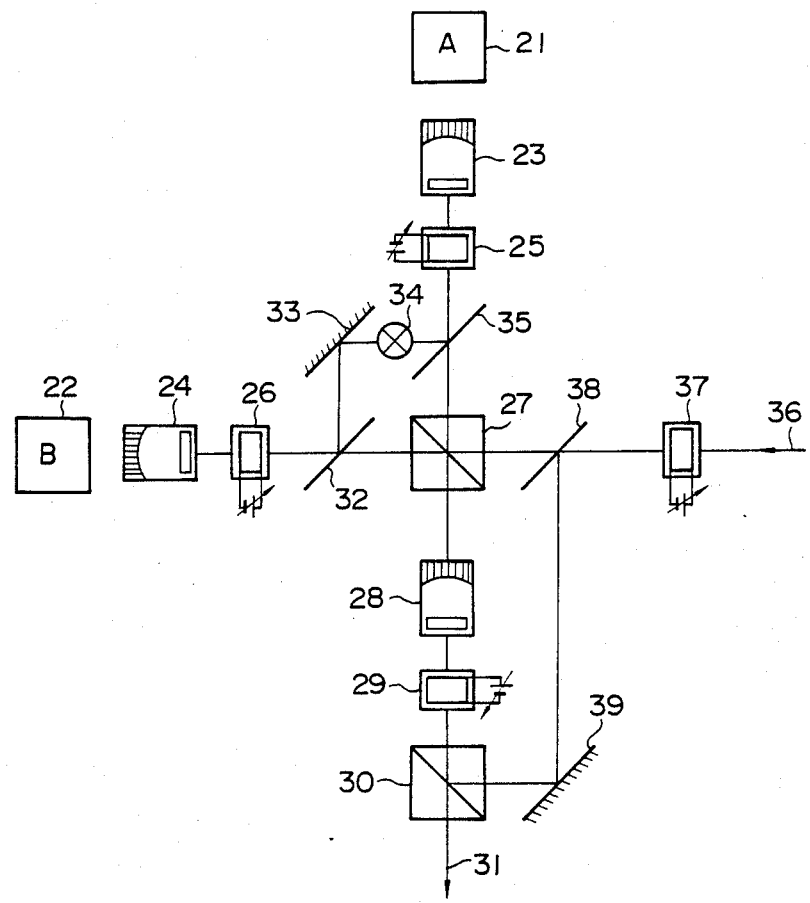
FIG. 4 is a block diagram of an embodiment of the processing unit to perform an operation of images in accordance with the present invention.

FIG. 4 shows a schematic diagram of an embodiment of the processing unit to perform an operation of images, which is built in accordance with the present invention.

Each of a spatial light modulator 23 actualized as a first imaging device, a spatial light modulator 24 actualized as a second imaging device and a spatial light modulator 28 actualized as a third imaging device can be operated in the same manner as that which is shown in FIG. 1.

The spatial light modulators 23 and 24 are arranged corresponding to a first image (A) 21 and a second image (B) 22, respectively. These images can be written into the respective spatial light modulators 23 and 24 by means of the incoherent light. Each of crystal plates 25, 26, 29 and 37 whereto a pre-determined control voltage is applied is operated as a halfwave plate.

34 denotes an optical shutter. 32, 35 and 38 denote beamsplitters, respectively. 27 and 30 denote polarized light beamsplitters, respectively.

The first image 21 written into the spatial light modulator 23 is read out by a laser beam 36 which is reflected and analyzed by the polarized light beam splitter 27. The image is then introduced into the photoelectric layer of the spatial light modulator 28 so as to be written therein.

The second image 22 written into the spatial light modulator 24 is read out by the laser beam 36 transmitted through the polarized light beam splitter 27 and is reflected and simultaneously analyzed. It is then introduced into the photoelectric layer of the spatial light modulator 28 and is written therein.

At this time, a voltage fed to crystal 37 is controlled by the above indicated selecting means, i.e., the polarized light beam splitter 27 and the crystal 37, and by this control the first and second images are successively written into the third spatial light modulator 28.

The OR operation can thus be performed in the above manner.

An XOR operation can be performed in the following manner. The shutter 34 is first opened. Thereafter, an image is read out of the spatial light modulator 24 by using the laser beam 36, and the read image is led to a 50—50 beamsplitter, and also to a 50—50 beamsplitter 35 after being reflected from a mirror 33. Another image is read out of the spatial light modulator 23 by the read image and is led to the polarized light beam splitter 27 passing through the 50—50 beamsplitter 35. These images are analyzed by the polarized light beam splitter 27 so as to perform the XOR operation thereof.

Figure 5:
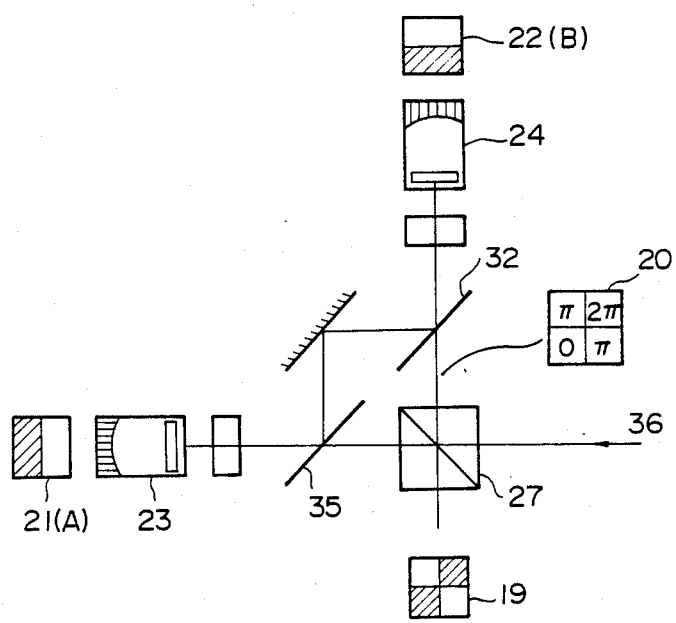
FIG. 5 is a block diagram for explaining the exclusive OR operation of an embodiment of the processing unit according to the present invention.

FIG. 5 is a block diagram for explaining the exclusive OR operation of the embodiment of the processing unit according to the present invention.

A first image (A) 21 is written into the spatial light modulator 23 used as the first imaging device by means of incoherent light (not shown). A second image (B) 22 is written into the spatial light modulator 24 used as the second imaging device by means of the incoherent light.

The spatial light modulators 23 and 24 are of the same type as described heretofore.

If the charge corresponds to the white portion of the image formed on the surface of the crystal in each spatial light modulator, its quantity is $\sigma\pi$ and it causes the phase retardation to be $\pi$ radians.

The contents of information are read out of the spatial light modulator 23 by means of coherent read-out light 36, and the light beam read out of the spatial light modulator 23 is incident on the spatial light modulator 24 passing through the beam splitters 35 and 32. Consequently, the read-out light 20 which has the phase retardation can be obtained.

If the phase difference is converted into the corresponding intensity signal, an output image 19 can be obtained. When the phase difference is $2\pi$ radians, the result is the same as that given by no phase difference.

The output image 19 is the result of an exclusive OR operation.

Logic operations of 16 types, which are performed by the processing unit to perform an operation of images, will be summarized hereinafter.

(1) OR operation

Different images are alternately read out of the spatial light modulators 23 and 24 passing through the polarized light beam splitter 27 when a voltage applied to the crystal 37 is controlled, and then the read images are sequentially written into the spatial light modulator 28 so as to perform an OR operation.

(2) NOR operation

The crystal 29 whereto a voltage is applied under the same conditions as described in "(1) OR operation" is used as a halfwave plate.

The crystal 29 is of the same type as crystal 6 and a pair of transparent electrodes are provided on both sides thereof.

(3) NAND operation

If the OR operation is performed by using the spatial light modulator 28 when different images are read out of the spatial light modulators 23 and 24 by applying proper voltages to the crystals 25 and 26, a NAND operation can be performed.

(4) AND operation

If the NAND operation is performed as mentioned in the item (3) and the crystal 29 is operated, whereto a voltage is applied, as a halfwave plate, an AND operation can be performed.

(5) XOR operation

An image 22 is read out of the spatial light modulator 24 and an image 21 is read out of the spatial light modulator 23 by the read light from the spatial light modulator 24 with the shutter 34 opened. Only the brighter portion of the image 22 is polarized by $\pi$ radians and the S-polarized light beam can be sent out of the spatial light modulator 24.

Thereafter, the brighter portion of the image 21 is polarized by $\pi$ radians. That is, the brighter portions of images A and B become the P-polarized light beam. The dark portions are not polarized further and remain P-polarized. If a portion of the image is modulated by one of the spatial light modulators 23 and 24, this portion becomes S-polarized. This is how an XOR operation is performed.

(6) $\overline{XOR}$ operation $\overline{A}$ denotes the inhibit of A, and $\overline{XOR}$ denotes the inhibit of the result of an XOR operation.

If an image is read out of the spatial light modulator 28 when a voltage is applied to crystal 29 under the same conditions as described in "(5) XOR operation", an $\overline{XOR}$ operation can be performed.

(7) $\overline{A}+B$ operation $\overline{A}$ can be obtained by a halfwave plate actualized by using the crystal 25 whereto a voltage is applied.

An OR operation can be performed with the spatial light modulator 28 to obtain $\overline{A}+B$ if $\overline{A}$ which is obtained in the above manner and B which is obtained from the spatial light modulator 24 are input to the polarized beam splitter 27.

(8) $A \cdot \overline{B} = \overline{\overline{A}+B}$ operation

If a voltage is applied to the crystal 29 under the same conditions as described in "(7) $\overline{A}+B$ operation", an $\overline{\overline{A}+B} = A \cdot \overline{B}$ operation can be performed.

(9) $A+\overline{B}$ operation $\overline{B}$ can be obtained by a halfwave plate actualized by using crystal 26 whereto a voltage is applied.

An OR operation can be performed to obtain $A+\overline{B}$ if $\overline{B}$ which is obtained in the above manner and A which is obtained from the spatial light modulator 23 are input to the polarized beam splitter 27.

(10) $\overline{A} \cdot B = \overline{A+\overline{B}}$ operation

If a voltage is applied to the crystal 29 under the same conditions as described in "(9) $A+\overline{B}$ operation", an $\overline{A+\overline{B}} = \overline{A} \cdot B$ operation can be performed.

(11) A operation

The contents of the spatial light modulator 23 are selected by applying a voltage to the crystal 37, and then A is written into the spatial light modulator 28. If the contents of the spatial light modulator 28 are read out, A can be obtained.

(12) $\overline{A}$ operation

When the contents of the spatial light modulator 28 are read in the same manner as described in "(11) A operation" and a voltage is applied to the crystal 29, $\overline{A}$ can be obtained.

(13) B operation

The contents of the spatial light modulator 24 are selected by applying no voltage to the crystal 37, and then B is written into the spatial light modulator 28. If the contents of the spatial light modulator 28 are read out, B can be obtained.

(14) $\overline{B}$ operation

When the contents of the spatial light modulator 28 are read in the same manne as described in "(13) B operation" and a voltage is applied to the crystal 29, $\overline{B}$ can be obtained.

(15) T (=TRUE) operation

A uniform light beam is written into the spatial light modulator 28 and then the contents of the spatial light modulator 28 are read out to obtain T (=TRUE).

(16) F (=FALSE) operation

The contents of the spatial light modulator 28, which have been written in the same manner as described in "(15) T (=TRUE) operation", are read out when a voltage is applied to the crystal 29. This result is F operation.

As described above, the processing unit to perform an operation of images, which is built in accordance with the present invention, comprises a first imaging device which can store a first image and which can output the first image or its inverted image in the form of an optical signal, a second imaging device which can store a second image and which can output the second image or its inverted image in the form of an optical signal, selection means which can select either the first or second image, and a third imaging device for storing the selected image.

What is claimed is:

1. A processing unit for performing an operation of images, comprising:
   first imaging means for storing a first image and outputting said first image or its inverted image in the form of a first optical signal;
   second imaging means for storing a second image and outputting said second image or its inverted image in the form of a second optical signal;
   selection means for selecting either said first image or said second image, said selection means receiving an input light beam and outputting an output beam having either a first or a second polarization, said output beam being directed to said first or second imaging means depending upon the polarization thereof;
   polarization determining means coupled to said selection means for determining the polarization of said output beam; and
   third imaging means for receiving said first optical signal when the output beam from said selection means has said first polarization and receiving said second optical signal when said output beam has said second polarization, said third imaging means storing said first or second optical signal thereby performing an OR operation of said first and second images.

2. A processing unit to perform an operation of images as claimed in claim 1, wherein said first, second and third imaging means are spatial light modulators.

3. A processing unit to perform an operation of images as claimed in claim 1 wherein said selection means comprises a beam splitter and a halfwave plate, said halfwave plate receiving said input light beam and outputting either a P-polarized or S-polarized light beam to said beam splitter in accordance with a voltage applied thereto by said polarization determining means, the P-polarized beam being directed by said beam splitter to one of said first and second imaging means and said S-polarized light beam being directed to the other of said first and second imaging means.

* * * * *